United States Patent
Billian et al.

(10) Patent No.: US 7,934,734 B2
(45) Date of Patent: May 3, 2011

(54) SUSPENSION AIR SPRING LIFT KIT

(75) Inventors: Randal M. Billian, Kalamazoo, MI (US); Aaron M. Smith, Indianapolis, IN (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 254 days.

(21) Appl. No.: 12/151,507

(22) Filed: May 7, 2008

(65) Prior Publication Data

US 2008/0284123 A1 Nov. 20, 2008

Related U.S. Application Data

(60) Provisional application No. 60/930,085, filed on May 14, 2007.

(51) Int. Cl.
*B60G 9/00* (2006.01)
(52) U.S. Cl. .............................................. 280/124.116
(58) Field of Classification Search ........... 280/124.116, 280/124.128, 124.1, 86.5, 124.157
See application file for complete search history.

(56) References Cited

U.S. PATENT DOCUMENTS

| | | | | |
|---|---|---|---|---|
| 2,869,891 | A | * | 1/1959 | Venditty et al. ......... 280/124.106 |
| 3,961,826 | A | * | 6/1976 | Sweet et al. ................... 301/125 |
| 4,763,953 | A | * | 8/1988 | Chalin .......................... 298/17 S |
| 4,773,670 | A | * | 9/1988 | Raidel, II ...................... 280/86.5 |
| 6,398,236 | B1 | | 6/2002 | Richardson |
| 6,416,069 | B1 | | 7/2002 | Ramsey |
| 6,471,223 | B1 | | 10/2002 | Richardson |
| 6,845,989 | B2 | | 1/2005 | Fulton |
| 6,880,839 | B2 | | 4/2005 | Keeler |
| 6,997,464 | B2 | | 2/2006 | Yakimishyn |
| 7,434,821 | B2 | * | 10/2008 | Hinz ............................ 280/86.5 |

FOREIGN PATENT DOCUMENTS

EP 0431673 6/1991

* cited by examiner

*Primary Examiner* — Faye M. Fleming

(57) ABSTRACT

A suspension air spring lift kit has a trailing arm having an end that is pivotally connected to a hanger bracket. A vertically oriented air bag is connected between another end of the trailing arm and a frame member of a vehicle, for example, a dump truck or a trailer in a tractor-trailer combination. An air spring system having a lower bracket and an upper bracket, with an air spring bag positioned between these two brackets, is attached between the frame member and the trailing arm. When the air spring bag is inflated, the air spring system lifts the trailing arm. When the air spring bag is deflated, the air spring system allows the trailing arm to be lowered.

17 Claims, 3 Drawing Sheets

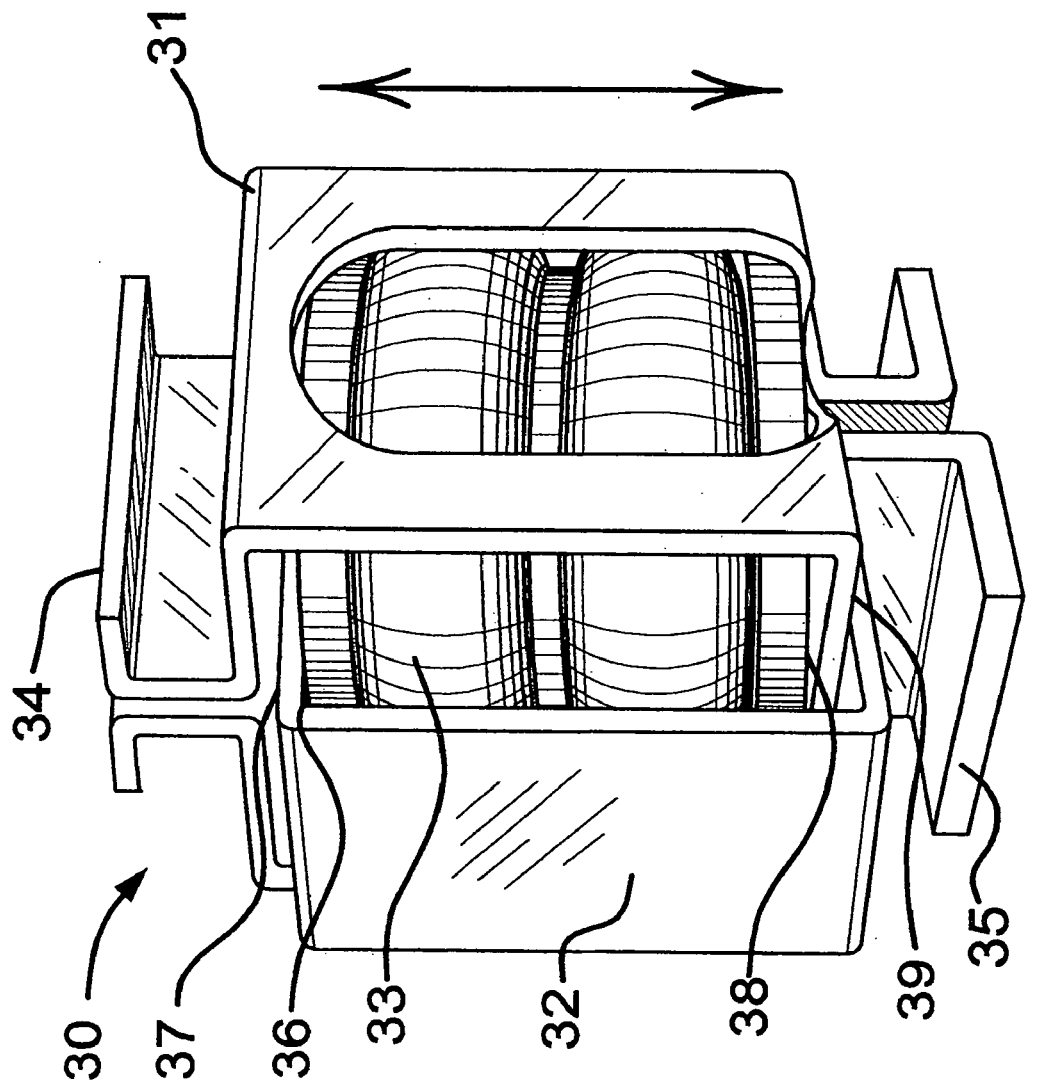

US 7,934,734 B2

SUSPENSION AIR SPRING LIFT KIT

RELATED APPLICATION

This application claims the benefit under 35 U.S.C. §119 (e) of U.S. Provisional Application No. 60/930,085, filed May 14, 2007, the entirety of which is hereby incorporated by reference.

FIELD OF THE INVENTION

The present invention relates to a suspension air lift kit for vehicles.

BACKGROUND OF THE INVENTION

Those skilled in the art know that a vehicle has a suspension for connecting one or more wheels to the frame of the vehicle. In addition, it may be desirable, for example, for dump trucks and for trailers in a tractor-trailer combination to have their vehicle carrying capacity increased. Hence, an additional axle and associated suspension, or suspensions, may be utilized to increase the carrying capacity of these vehicles. For ease of use and improved vehicle fuel consumption, it has been found that the additional axle(s) can be lowered into service when needed and, subsequently, lifted from service when not required.

Examples of relevant art involving movable suspensions are as follows. U.S. Pat. No. 6,997,464, teaches a lift axle suspension that comprises a first air bag, a second air bag, and a lever. When an axle is to be lowered, the second air bag is deflated and the first air bag, which is connected to the axle, is inflated so that the axle is lowered. When the axle is to be raised, the first air bag is deflated and the second air bag, which is connected to a first end of the lever, is inflated. In response to the inflation of the second air bag, the lever pivots about a fulcrum to lift the axle which is connected to the second end of the lever.

U.S. Pat. No. 6,398,236 teaches a lift axle suspension with axle reservoir comprising two trailing arms that are pivotally connected to a hanger bracket that is connected to a vehicle frame. An air spring resists rotation of the trailing arms when the axle is in the lowered position. A lift bag, which is positioned between the hanger bracket and the axle, is utilized to raise the axle.

U.S. Pat. No. 6,471,223 discloses an auxiliary lift axle suspension that comprises a hanger bracket that is connected to an inflatable lift bag and pivotally connected to a first end of a trailing arm. A second end of the trailing arm is connected to an air spring. The lift bag, which is connected to another end of the trailing arm, is utilized to raise the trailing arm and an attached axle.

U.S. Pat. No. 6,880,839 discloses a parallelogram lift axle suspension system that includes an in-line lift bellows located between and vertically aligned with a pair of upper and lower control arms so as to provide bi-directional expansion and contraction of the lift bellows. These motions raise and lower the suspension while increasing the space available between the longitudinal frame rails. This results in enabling the use of the suspension in certain vehicles by avoiding interference with other vehicle components of the vehicle located in this space.

European Patent Application Publication No. 0431673 involves an axle lift system for a vehicle where a lift bellows is positioned between a fixed support and a bearing arm, which is connected to an axle. When the axle is to be lifted, pressurized air expands the lift bellows, which causes the bearing arm to lift the axle.

U.S. Pat. Nos. 6,845,989 and 6,416,069 generally disclose a lift axle device that comprises an air spring that is connected on one end to a hanger and on a second end to a trailing arm, which is connected to an axle. When the axle is to be lifted, the air spring is expanded, which in turn causes the trailing arm with axle attached thereto to be lifted.

As detailed above, the relevant art requires various parts that are bulky and in some cases complicated, which tends to add weight and cost. Also, the relevant art makes assembly and replacement of lifting and lowering mechanisms difficult. Further, the art that utilizes bushings at various pivot points may experience an increase in impact loading and fatigue during transport in the lifted position. Thus, a more reliable, compact, lower weight, and a more easily moveable air lift kit has been sought.

SUMMARY OF THE INVENTION

A suspension air spring lift kit comprises a trailing arm having an end portion that is pivotally connected to a hanger bracket. A lower bracket is connected to the trailing arm while an upper bracket is connected to the frame member. An air spring bag is disposed between the lower bracket and the upper bracket, wherein when the air spring bag is expanded, the trailing arm is lifted.

Further advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

FIG. 3 is a three dimensional view of an air spring system of FIG. 2 in an expanded position.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
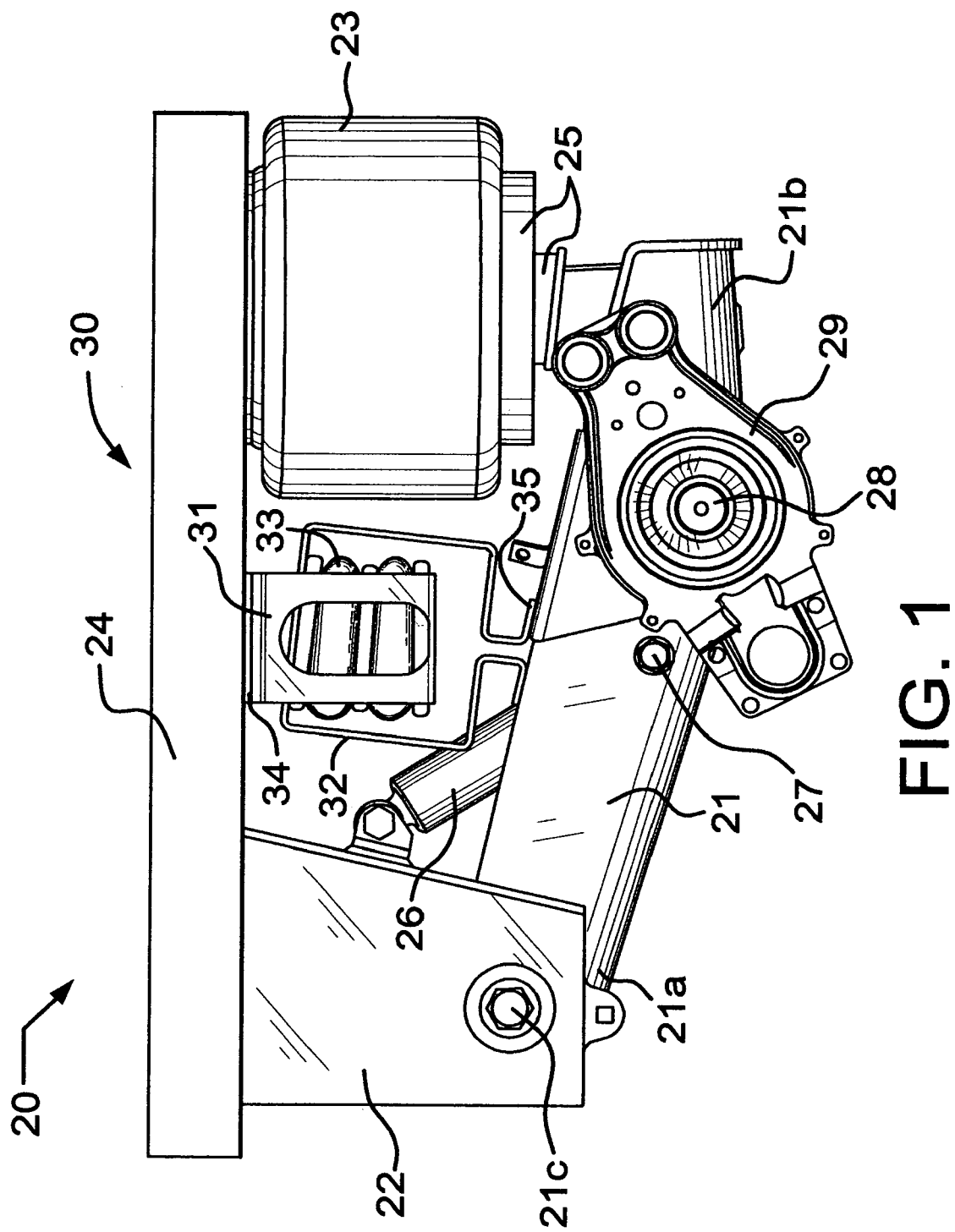
FIG. 1 is a side elevation view of an air spring lift kit in a lowered position in accordance with the present invention.

FIG. 1 illustrates an air spring lift kit 20 that is in a lowered position. The air spring lift kit 20 comprises a trailing arm 21 having end portions 21a, 21b, where the end portion 21a is pivotally disposed at a trailing arm pivot 21c on a hanger bracket 22. The hanger bracket 22 is disposed on a vehicle frame 24, for example, the frame of a truck or a trailer in a tractor-trailer combination.

Figure 2:
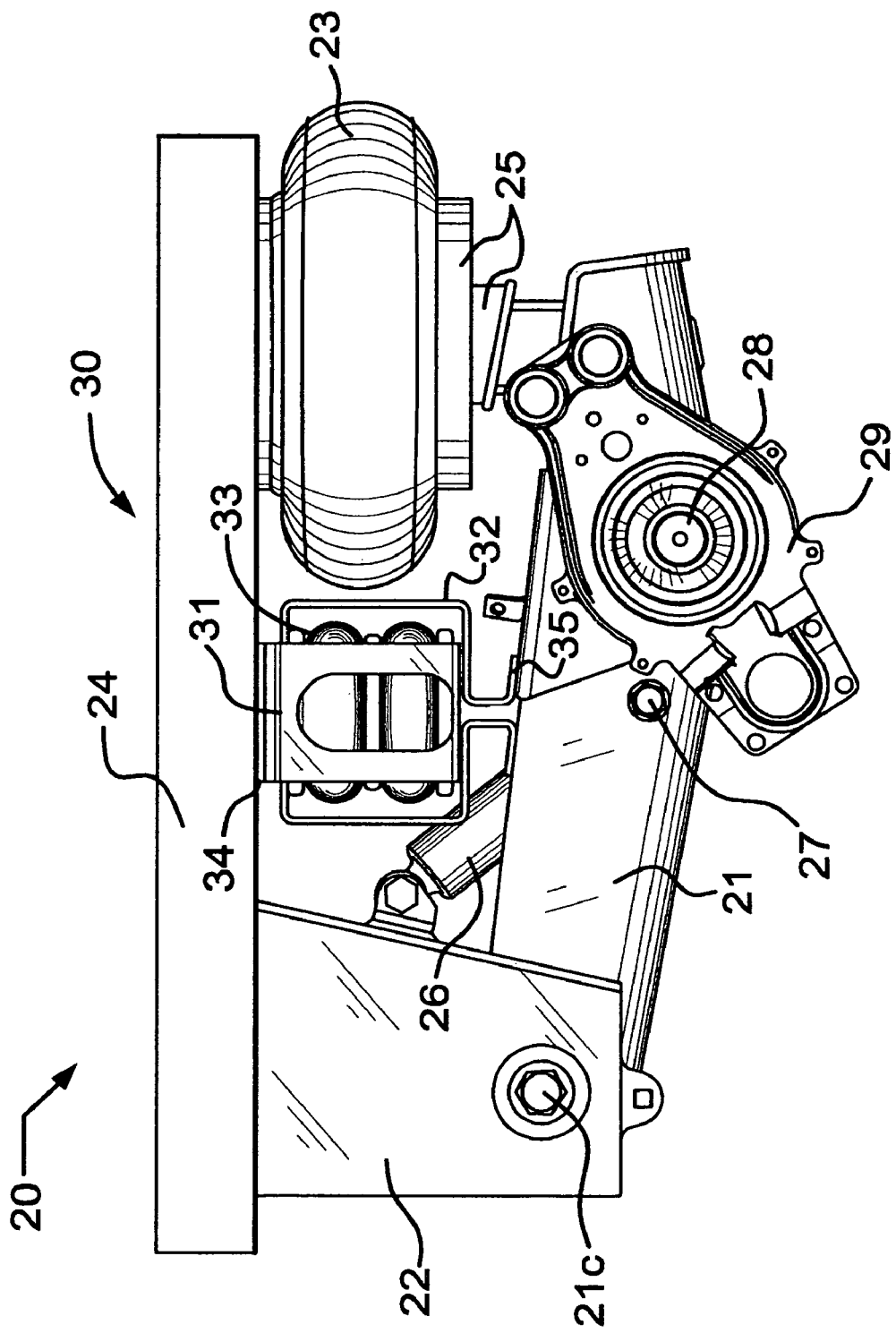
FIG. 2 is a side elevation view of the air spring lift kit of FIG. 1 in a raised position.

FIGS. 1 and 2 show, for example, the head of a bolt at the trailing arm pivot point 21c, where the bolt extends through the hanger bracket 22 and the trailing arm 21. A nut (not shown but common in the art) may be secured to the other end of the bolt so as to pivotally secure the trailing arm 21 to the hanger bracket 22.

A substantially vertically oriented air bag 23 (which is substantially perpendicular to the frame member 24 and which is shown in an expanded/lowered position in FIG. 1) is disposed between the end portion 21b of the trailing arm 21 and the frame member 24. Also shown in FIG. 1 is a mounting member 25 (for example, a piston or a pedestal) that is disposed between the air bag 23 and the second end portion 21b of the trailing arm 21.

Further, FIG. 1 illustrates a suspension shock absorber 26 that is connected at a pivot point 27 on the trailing arm 21 and at another end the suspension shock absorber 26 is pivotally connected to the hanger bracket 22. In addition, an axle 28 and an attached wheel bracket 29 are shown disposed on the trailing arm 21.

Illustrated in both FIGS. 1-2 is an air spring system 30 that is disposed between the frame 24 and the trailing arm 21. The air spring system 30 comprises an upper bracket 31, a lower bracket 32, and an air spring bag 33 (also see FIG. 3). The top 34 of the air spring system 30 is attached (for example, welded, bolted, or integrally formed) to the frame 24, while the bottom 35 of the air spring system 30 is attached (for example, welded, bolted, or integrally formed) to the trailing arm 21. The air spring system 30 is substantially vertically oriented. The lower bracket 32 is attached to the trailing arm 21 between the hanger bracket 22 and the vertically oriented air bag 23.

As depicted in FIG. 1, the air spring bag 33 is deflated, while the substantially vertically oriented air bag 23 is inflated, thus allowing the trailer arm 21 to move into a lowered position. This, in turn, distributes the weight on the vehicles tires (not shown), cushions the load on the axle 28, and may lower vehicle fuel consumption.

In FIGS. 2-3 the air spring bag 33 is shown inflated, for example, expanded by way of pneumatic means that are not shown but that are common in the art. With the substantially vertically oriented air bag 23 deflated, the trailing arm 21 is moved up into a raised position.

The air spring system 30 is constructed and operates in the following manner. The upper bracket 31 and the lower bracket 32 are at least partially disposed and move within one another (as shown by the double headed arrow in FIG. 3, which is a three dimensional view to the left hand side of the air spring system 30 in FIG. 2). The air spring bag top 36 is attached to the top 37 of the lower bracket 32, while the air spring bag bottom 38 is attached to the bottom 39 of the upper bracket 31. As a result, when the air spring bag 33 is inflated, the top 37 of the lower bracket 32 and the bottom 39 of the upper bracket 31 separate relative to one another (see, for example, FIG. 2). Conversely, when the air spring bag 33 is deflated, the top 37 of the lower bracket 32 moves toward the bottom 39 of the upper bracket 31 (see, for example, FIG. 1).

As a result of the expansion (i.e., FIG. 2) of the air spring bag 33, an upward directed pulling force is applied to the trailing arm 21, thus raising one or more wheels/tires (not shown but common in the art) toward the frame 24. As a result of the deflation (i.e., FIG. 1) of the air spring bag 33, the trailing arm 21 may move down due to gravity, thus lowering one or more wheels/tires away from the frame 24.

Hence, the construction of the air spring lift kit 20 is not complicated, has minimal parts, and functions by way of simple means. Thereby, the air spring system 30 adds little additional weight and costs to the air spring lift kit 20, requires no bushings, and more easily allows for raising and lowering of the suspension. Although the air spring lift kit 20 is particularly suited for a truck or trailer, the air spring lift kit 20 is also suited for any vehicle where an added suspension could be applied.

It is to be understood that the patent drawings are not intended to define precise proportions of the elements of the invention but that the patent drawings are intended to be utilized in conjunction with the rest of the specification. Unless expressly specified to the contrary, it should also be understood that the illustrated differences between various elements of the invention, which may be in fractions of a unit of measurement, are not intended to be utilized to precisely measure those differences between the various elements.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A suspension air spring lift kit, comprising:
    a trailing arm having an end portion that is pivotally connected to a hanger bracket;
    a lower bracket attached to said trailing arm;
    an upper bracket attached to a frame member; and
    an air spring bag disposed between said lower bracket and said upper bracket;
    wherein, when said air spring bag is expanded, said trailing arm is placed in a raised position;
    wherein said upper bracket and said lower bracket are at least partially disposed and move within one another, the top of said air spring bag is attached to the top of said lower bracket, the bottom of said air spring bag is attached to the bottom of said upper bracket, so that, when said air spring bag is inflated, the top of said lower bracket and the bottom of said upper bracket separate relative to one another, and, conversely, when said air spring bag is deflated, the top of said lower bracket moves toward the bottom of said upper bracket.

2. The suspension air spring lift kit of claim 1, wherein said air spring bag is vertically oriented.

3. The suspension air spring lift kit of claim 1, further comprising a vertically oriented air bag positioned between another end portion of said trailing arm and said frame member.

4. The suspension air spring lift kit of claim 3, wherein said lower bracket is attached to said trailing arm, between said hanger bracket and said vertically oriented air bag.

5. The suspension air spring lift kit of claim 4, wherein said vertically oriented air bag is substantially perpendicular to said frame member.

6. The suspension air spring lift kit of claim 4, wherein said vertically oriented air bag is disposed on said trailing arm by way of a mounting member.

7. The suspension air spring lift kit of claim 6, wherein said mounting member comprises a piston.

8. The suspension air spring lift kit of claim 1, further comprising an axle disposed on said trailing arm, wherein, when said air spring bag is deflated, said trailing arm is placed in a lowered position.

9. A vehicle comprising said suspension air spring lift kit of claim 1.

10. The vehicle of claim 9, wherein said vehicle comprises a dump truck or a trailer in a tractor-trailer combination.

11. A method of moving a suspension, comprising:
    providing a trailing arm pivotally connected on an end thereof to a hanger bracket;
    providing a lower bracket attached to said trailing arm;

providing an upper bracket attached to a frame member; and providing an air spring bag disposed between said lower bracket and said upper bracket, wherein said upper bracket and said lower bracket are at least partially disposed and move within one another, the top of said air spring bag is attached to the top of said lower bracket, and the bottom of said air spring bag is attached to the bottom of said upper bracket;

whereby inflating said air spring bag causes the top of said lower bracket and the bottom of said upper bracket to separate from another and lift said trailing arm and deflating said air spring bag causes the top of said lower bracket and the bottom of said upper bracket to move toward one another and lower said trailing arm.

12. The method of claim 11, further comprising providing a vertically oriented air bag connected to said trailing arm at an end opposite said hanger bracket, thereby cushioning a load of a vehicle.

13. A suspension air spring lift kit, comprising:

a trailing arm having an end portion that is pivotally connected to a hanger bracket;

a vertically oriented air bag connected to said trailing arm at an end opposite said hanger bracket;

a lower bracket attached to said trailing arm;

an upper bracket attached to a frame member;

an air spring bag disposed between said lower bracket and said upper bracket; and a shock absorber disposed between said trailing arm and said frame member.

14. The suspension air spring lift kit of claim 13, wherein said air spring bag is vertically oriented.

15. The suspension air spring lift kit of claim 13, wherein said lower bracket is attached to said trailing arm, between said hanger bracket and said vertically oriented air bag.

16. The suspension air spring lift kit of claim 13, wherein said vertically oriented air bag is disposed on said trailing arm by way of a mounting member.

17. The suspension air spring lift kit of claim 16, wherein said mounting member comprises a piston.

* * * * *